United States Patent [19]
Schousek

[11] Patent Number: 5,959,538
[45] Date of Patent: Sep. 28, 1999

[54] FORCE SENSING RESISTOR CONDITIONING CIRCUIT

[75] Inventor: Brian Walter Schousek, Kokomo, Ind.

[73] Assignee: Vital Innovations, Inc., Somerset, Wis.

[21] Appl. No.: 08/951,145

[22] Filed: Oct. 15, 1997

[51] Int. Cl.$^6$ .................................................. G08B 21/00
[52] U.S. Cl. ........................ 340/665; 340/635; 340/501; 324/601; 324/609; 324/691
[58] Field of Search .................................. 340/665, 635, 340/501; 324/601, 609, 691

[56] References Cited

U.S. PATENT DOCUMENTS

| | | | |
|---|---|---|---|
| 5,142,235 | 8/1992 | Matsumoto et al. | 324/537 |
| 5,159,159 | 10/1992 | Asher | 178/18.05 |
| 5,218,298 | 6/1993 | Vig | 324/251 |
| 5,506,509 | 4/1996 | Susak . | |

FOREIGN PATENT DOCUMENTS

| | | |
|---|---|---|
| 0 844 749 A2 | 11/1997 | European Pat. Off. . |
| 242 335 A3 | 1/1987 | German Dem. Rep. . |
| 3510737 A1 | 12/1985 | Germany . |

OTHER PUBLICATIONS

"FSR Button Wiring Diagram for Non–Relay Systems (Global)," Drawing No. 50B17, Revision Record, Elevator Products Corporation, 1111 Rt. 46 East Little Falls, N.J. 07424.

"The New Shape of Force Sensing Technology," UniForce Technical Notes and Sensor Design Guide, Force Imaging Technologies, Chicago, Illinois, 1995.

*Primary Examiner*—Benjamin C. Lee
*Attorney, Agent, or Firm*—Reidlaw, L.L.C.; John S. Reid

[57] ABSTRACT

The present invention discloses a circuit for providing a variable output signal in response to a physical parameter sensed by a sensor in the circuit, preferably a force sensing resistor. The current mirror may consist of two transistors having common bases. Flow of current through the first transistor flows through the sensor and through a parallel resistor. This current is mirrored in a second transistor which provides flow of current which may either be used as an output signal or, more preferably, as a base current for a transistor which is used to control output signal voltage. The circuit uses the current mirror in connection with the sensor to eliminate the need for a negative voltage supply. The circuit may further advantageously contain a voltage limiter module which is used to limit the voltage which may be applied across the sensor if the range of input signals or the desired range of output signals exceeds the sensor's capability. The voltage limiter module establishes a fixed voltage across the sensor which is lower than the expected input or the desired output voltage ranges. The resistor in parallel with the sensor is used to ensure that a current is applied to the transistor in the voltage limiter module so that the transistor may maintain its operation as an emitter follower. The circuit may also be used with thermistors for temperature compensation.

51 Claims, 7 Drawing Sheets

FORCE SENSING RESISTOR CONDITIONING CIRCUIT

TECHNICAL FIELD

This invention pertains to a circuit for generating an output signal in response to a physical input, and more particularly to a force sensing resistor conditioning circuit.

BACKGROUND OF THE INVENTION

Figure 1:
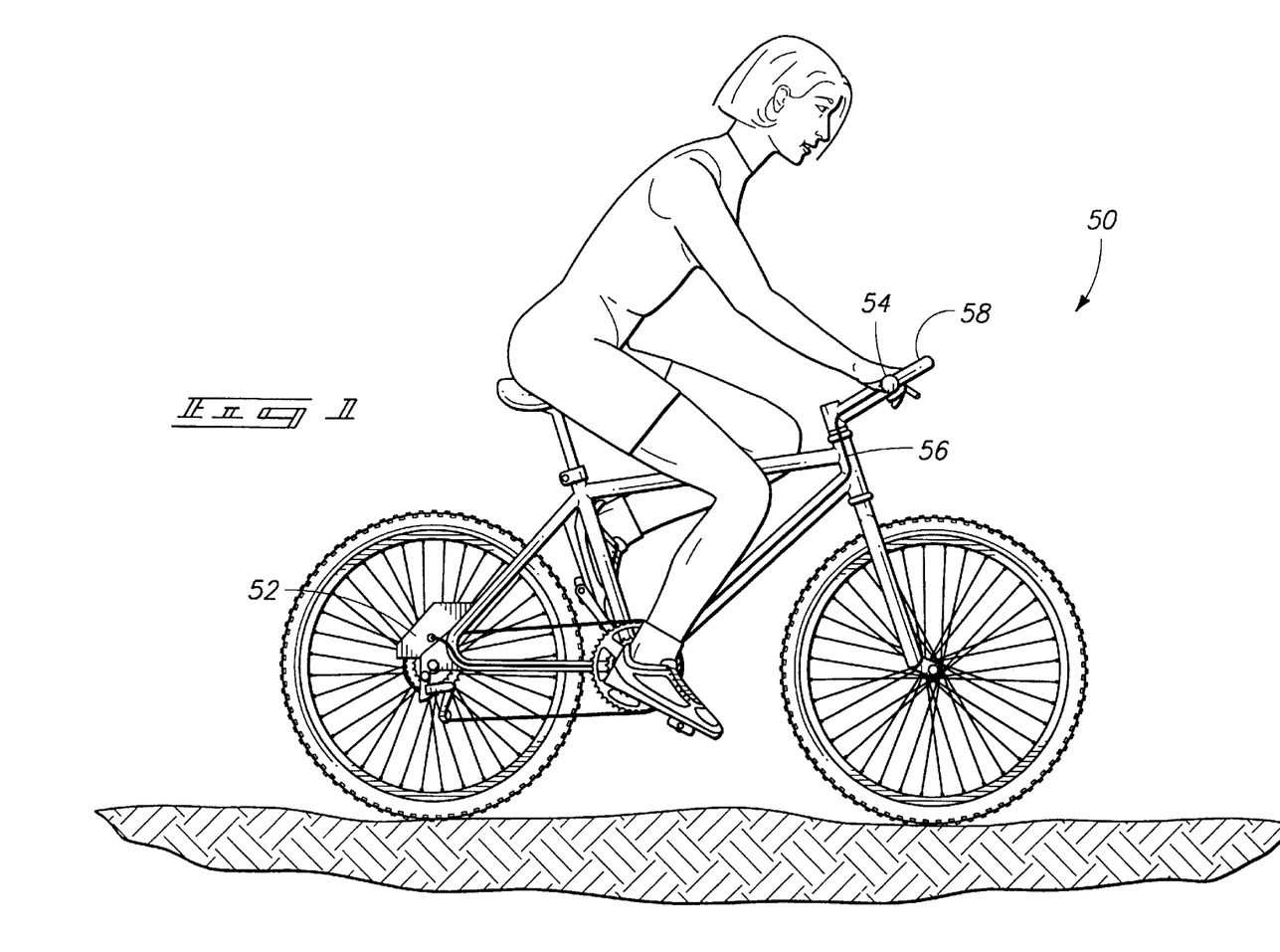
FIG. 1 is an environmental view showing one application for the circuit of the present invention.

In many applications it is desirable to generate an electrical signal in response to a force input. It is particularly desirable to be able to generate a signal having a signal strength proportional to the force input. Specific applications abound. For example, turning to FIG. 1, a bicycle 50 with an electric motor 52 is shown. It is desirable to be able to control the speed of the electric motor such as for example by the rider being able to press her thumb against a force sensing button, thus producing a stronger signal which may be used to control the speed of the electric motor. Such a desirable configuration is shown in FIG. 2 wherein the operator's thumb is shown in phantom over speed control button 5. Other applications where it is desirable to produce an electrical signal proportional to a force input include golf carts or any driven vehicle, airplane controls, and cursor positioning and screen scrolling controls in personal computer applications. A further application where it would be useful to produce a output signal responsive to a force input would for example be in wireless control units for home entertainment, as for example to control the volume, tone, and rate at which channels on a television channel selector can be adjusted. That is, the harder the button is pressed, the faster the channels would change. A further use of the circuit would be in automotive applications, such as a horn switch, environmental controls (heating, air conditioning), and entertainment system controls.

Circuits which may perform the desirable function of providing an output signal proportional to a force input are known. However, such circuits have certain limitations.

The first limitation of the prior art circuits is that it is often desirable to have a voltage range available for the output signal which exceeds the capacity of the force sensor. In certain applications, an output voltage range of 5 volts is desirable. However, many force sensors may only withstand a continuous voltage of approximately 1 volt. Therefore, the circuit must be designed for only a 20 percent duty cycle by adding additional components to the circuit (typically a microprocessor), thereby significantly increasing cost of the circuit. It is desirable, however, to keep the cost of the circuit low, for obvious reasons.

An additional problem with the prior art is that it is desirable to produce an output voltage signal, however most force sensors produce a varying current in response to force applied to the sensor. The current must therefore be converted to an output voltage. This is done by an operational amplifier (op amp) configured as a current-to-voltage converter. This provides a negative voltage, which must be inverted to provide a positive voltage for the output. A positive voltage is desirable to be able to perform an analog to digital conversion at the output. Inverting the negative voltage requires the addition of a negative supply voltage generator, as well as relatively expensive op amps.

In addition to being simple and therefore relatively inexpensive and simple to manufacture, a force sensitive circuit should be relatively temperature stable so that it may be used in a range of temperatures to be experienced. For example, in the example where the force sensitive circuit is used to control the speed of an electric motor connected to a bicycle, ambient temperatures may vary between 0° C. and 40° C., and beyond.

Therefore, what is needed in the art is a relatively inexpensive, easy to manufacture circuit which produces a voltage output in response to the force input, avoiding the problems of voltage limitations across the sensor as well as the need to invert negative voltages and compensate for temperature variations.

BRIEF DESCRIPTION OF THE DRAWINGS

Preferred embodiments of the invention are described below with reference to the following accompanying drawings.

FIG. 2 is a detail plan view of the bicycle handlebars of the bicycle shown in FIG. 1 showing an application of the circuit of the present invention.

FIG. 3 is an enlargement showing a plan view of the completed device of the circuit of the present invention.

DETAILED DESCRIPTION OF THE PREFERRED EMBODIMENTS

The present invention discloses a circuit for generating an electrical signal in proportion to a force input. The circuit comprises a force sensor, a signal output node, and connections for a power supply. The circuit uses a current mirror to cause a positive voltage to be generated in response to increased flow of current through the force sensor. The invention advantageously further comprises a voltage limiter to limit the voltage across the sensor to that within the sensor manufacturer's specifications, while allowing the full supply voltage to be available as the output signal.

Figure 7:
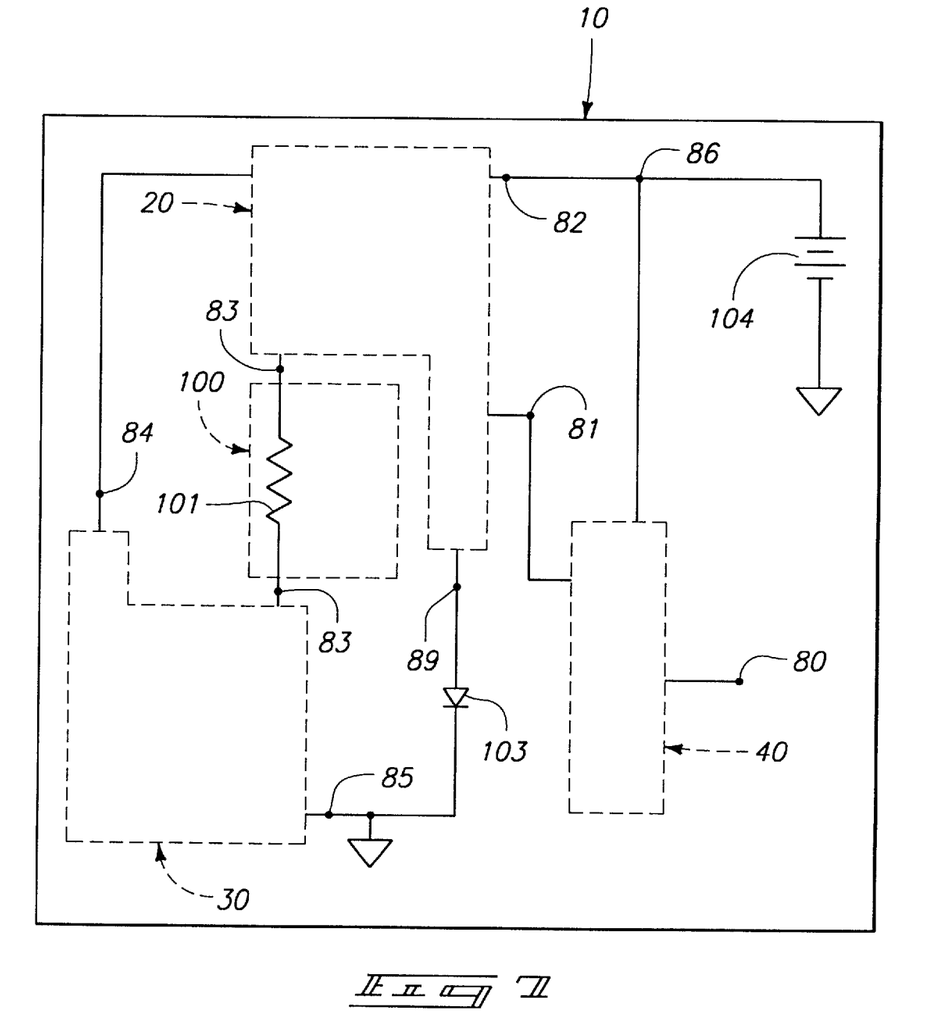
FIG. 7 is a drawing showing a block arrangement of the modules of the present invention.

Turning to FIG. 7, the preferred embodiment of the present invention is shown. The force sensing resistor conditioning circuit 10 comprises a current mirror module 20, a voltage limiter module 30, an output controller/output buffer module 40, and a force responsive module 100. The voltage limiter module serves to protect the force resisting sensor 101 from electrical overload. Note that diode 103 is not a required component.

The current mirror module 20 replaces the negative voltage supply of the prior art to provide a positive output voltage in response to current passing through sensor 101.

The output buffer module 40 serves to buffer the rest of the circuit 10 from effects due to the attached load (not shown) which would be attached to buffer output node 80.

Force response module 100 comprises the sensor 101 which is used to generate a current signal in response to pressure being applied thereto, which current is then used to drive the circuit to produce the output signal.

The various modules and their connection with one another will be further described below.

Voltage Limiter Module

Figure 4:
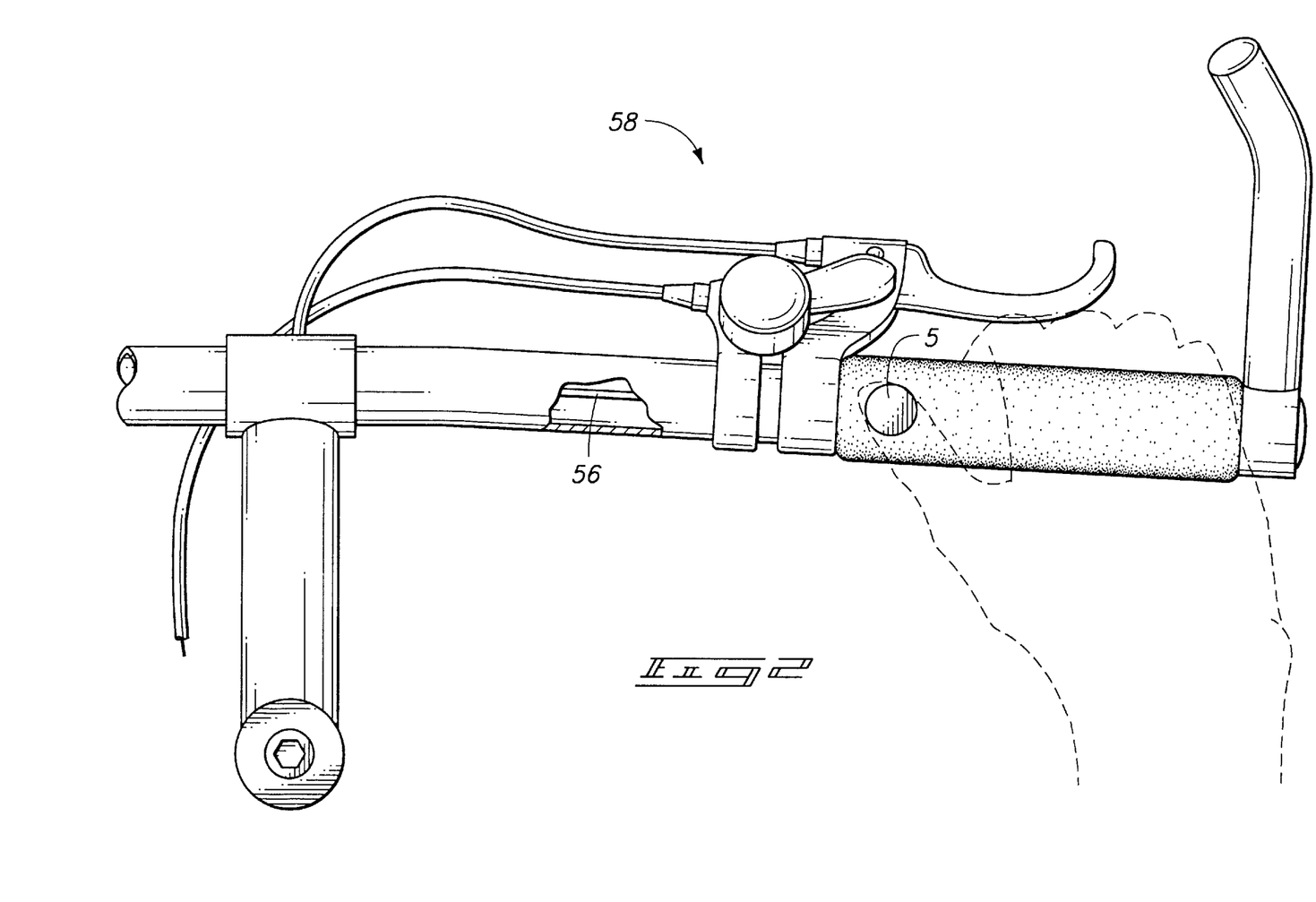
FIG. 4 is a circuit diagram of the circuit of the present invention.
Figure 5:
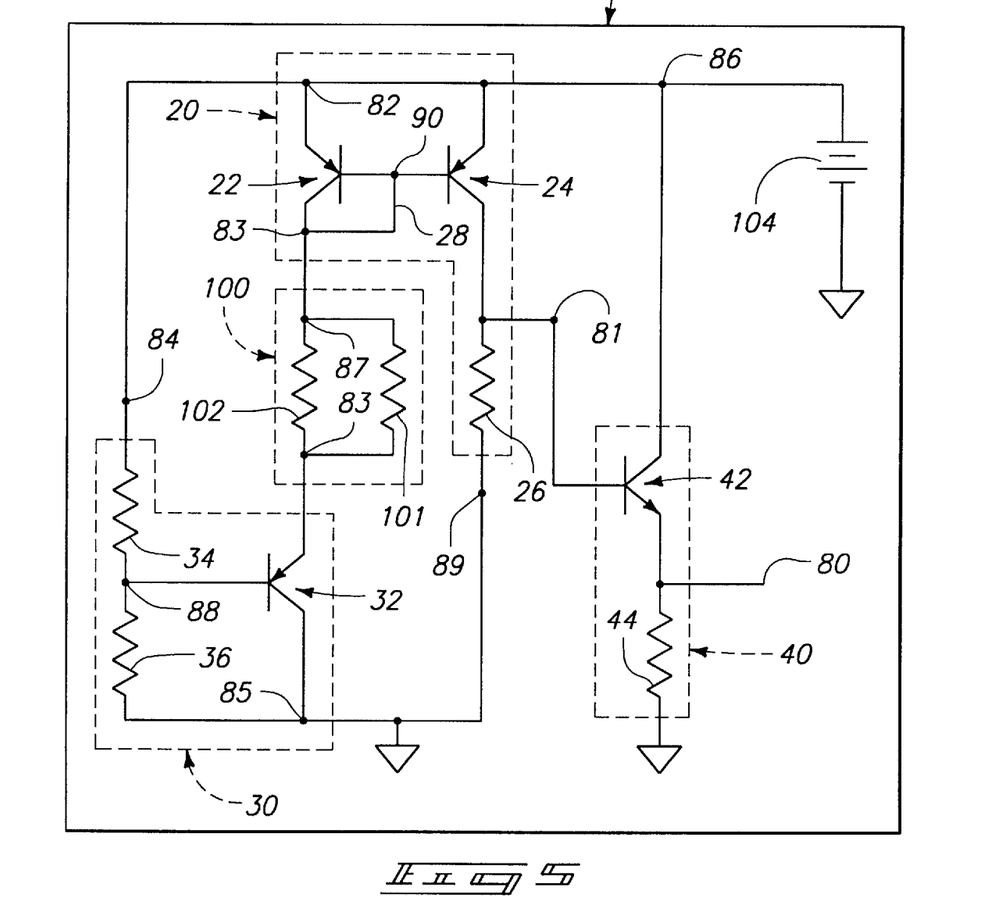
FIG. 5 is a circuit diagram showing an alternate embodiment of the circuit of the present invention.

A voltage limiter module 30 of FIG. 5 is used in applications where the voltage range desired for an output signal exceeds the voltage capacity of the sensor 101. It should therefore be noted that in applications where a voltage equal to the desired output voltage range may safely be applied across sensor 101, the voltage limiter module 30 is not required. Such a configuration is shown in FIG. 4 where the voltage limiter module has been eliminated. However, in most applications, it will be desirable to use a standard power supply of 5 or 12 volts, thereby requiring the voltage limiter module to protect the sensor.

The voltage limiter module is configured to establish the voltage at the bottom side of the sensor 101 at node 83 at a fixed amount. The voltage at the top end of the sensor 101 at node 87 is fixed at a certain higher voltage, as will be discussed further below. In this manner, a relatively constant voltage is established across sensor 101 and resistor 102 which are in parallel.

Voltage limiter module 30 may comprise various configurations and still provide the same function of establishing a relatively fixed voltage across sensor 101. In the embodiment shown in FIG. 5, voltage limiter module 30 comprises a voltage divider which comprises resistors 34 and 36 in series having intermediate node 88. The upper end of resistor 34 is connected at voltage limiter first node 84 to the input node 82 which is further connectable to the power supply 104. The second end of the second resistor 36 is preferably attached to ground at voltage limiter module third node 85. Voltage limiter module 30 is further provided with a bipolar junction transistor (b-j-t) having a base, emitter, and collector. The base of transistor 32 is connected to the node 88 which is intermediate and in series with resistors 34 and 36. The emitter of transistor 32 is connected to the force response module 100 at node 83, and consequently to the lower end of the sensor 101. The collector of transistor 32 is connected voltage limiter third node 85 which is preferably grounded. In the embodiment shown in FIG. 5 transistor 32 is a PNP transistor. It will be appreciated however that the entire circuits of FIGS. 4–6 may be duplicated using inverse components (i.e., using NPN transistors where the diagram shows PNP transistors, and vice versa), yet still achieving the same effect.

Transistor 32, along with the resistor divider formed by resistors 34 and 36, serves to protect the sensor 101 from electrical overload. Transistor 32 serves as an emitter follower with its emitter remaining at a voltage approximately one diode drop above the voltage set by resistors 34 and 36. Selection of the divider voltage is made to ensure that the voltage across the sensor 101 does not exceed the voltage rating of the sensor across the temperature and component variation range. As will be described further below, resistor 102 is selected to ensure that adequate current flows through transistor 32 to maintain its operation as an emitter follower.

The voltage limiter module shown in FIG. 5 may be replaced with a precision voltage reference.

Figure 6A:
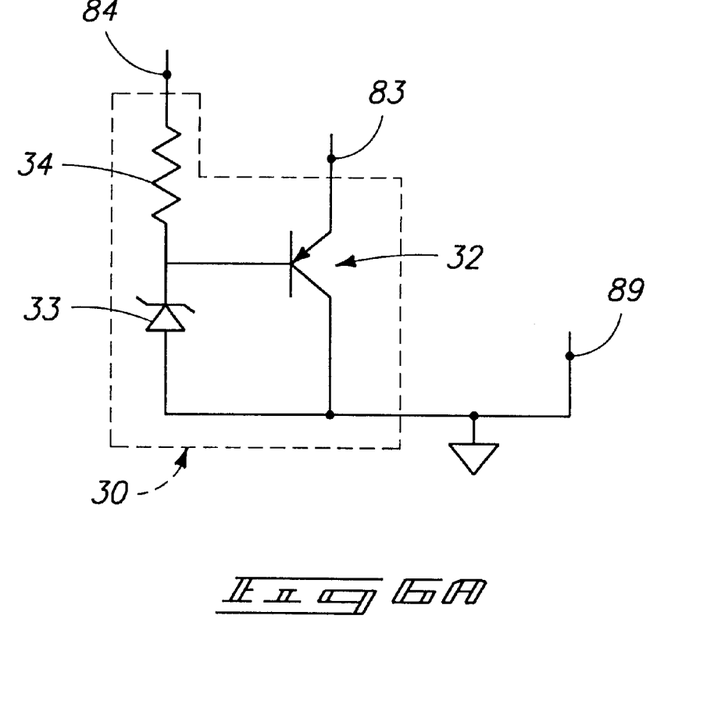
FIG. 6A shows a first alternate embodiment of the voltage limiter module shown in FIG. 5.
Figure 6B:
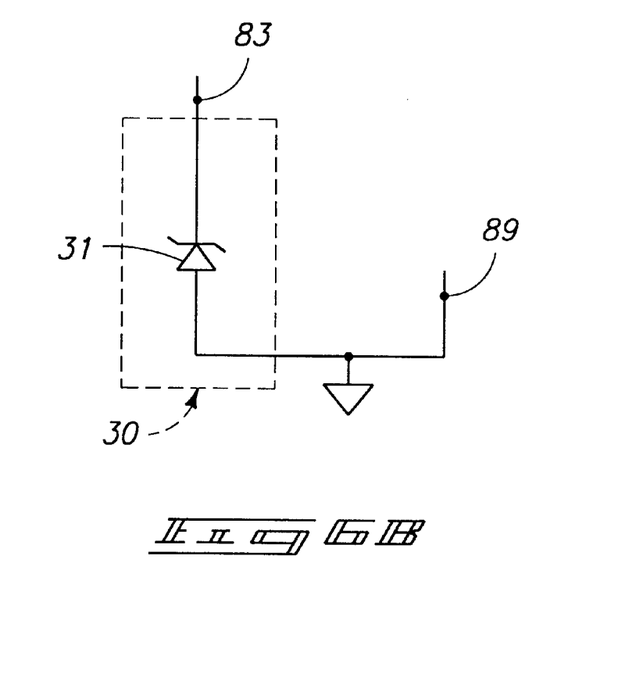
FIG. 6B shows a second alternate embodiment of the voltage limiter module shown in FIG. 5.

Alternate embodiments of the voltage limiter module are shown in FIGS. 6A and 6B. In FIG. 6A resistor 36 of FIG. 5 is replaced with diode 33. Diode 33 is preferably a Zener diode. In FIG. 6B transistor 32 of FIG. 5 is replaced with diode 31 located between nodes 83 and 89, and resistors 34 and 36 are eliminated, along with the connection between nodes 82 and 85 of FIG. 5. Diode 31 is preferably a Zener diode.

The operation of the voltage limiter module in conjunction with the other modules of the circuit will be described further below.

Current Mirror Module

Circuit 10 of FIG. 5 includes a current mirror module 20. Current mirror module 20 provides a positive voltage output in response to changes in current through sensor 101.

Current mirror module 20 comprises an input node 82 which is connectable to the power source 104. In the embodiment where a voltage limiter module 30 is used, the input node 82 of current mirror 20 is connected to the voltage limiter module first node 84. Current mirror module 20 further comprises sensor node 87 which is preferably connected to the force response module 100. Current mirror module 20 further comprises output node 81 and may further comprise voltage fixing node 89.

The embodiment of the current mirror module 20 shown in FIG. 5 comprises a pair of b-j-t transistors 22 and 24. Transistors 22 and 24 are PNP transistors in the example shown in FIG. 5, but, as described earlier, in an inverse circuit transistors 22 and 24 would be NPN transistors. Transistors 22 and 24 have emitters commonly connected to input node 82 and bases having a common connection. Further, the collector of transistor 22 is connected to the common base connection point 90.

Current mirror module 20 advantageously further comprises resistor 26. Resistor 26 works in conjunction with force response module 100 as will be more fully described below.

The transistor arrangement shown in the current mirror module in FIG. 5 may be replaced with a monolithic transistor pair or an integrated circuit current mirror. The configuration shown in FIG. 5 provides a low-cost solution in relatively modest volumes.

Further details and the operation of the current mirror module will be described further below.

Force Response Module

Force response module 100 of FIG. 5 is connected at sensor node 87 to first output node 83 of the current mirror module 20. Force response module 100 is further connected at output node 83 to the voltage limiter module 30.

One embodiment of the force response module 100 of the present invention is shown in FIG. 5. The force response module comprises sensor 101. Sensor 101 may be a force sensing resistor (FSR) which varies its resistance in response to pressure applied to the sensor. Other sensors having similar response characteristics may be substituted for the force sensing resistor. Generally, any sensor which alters impedance or varies current in response to a physical input, for example force, temperature and light, may be employed in the circuit of the present invention. The description of sensor 101 as a "force sensor" should not be understood to limit the scope of the application of the invention. In an alternate embodiment, the sensor 101 may be replaced with a thermistor in the circuit used to provide linearization of the thermistor for temperature compensation. That is, when sensor 101 is replaced with a thermistor, as the temperature in an application decreases, the resistance in the thermistor will decrease. Conversely, as the temperature increases, the resistance in the thermistor will increase. Such response is essentially identical to the response of the force sensor except that it is in response to a change in temperature as opposed to a change in applied force. The circuit can therefore be used to compensate for temperature variations in applications where it is desirable to have a stable circuit over a wide variety of temperatures.

Output Buffer Module

Output buffer module 40 is shown in FIG. 5. Note that the output buffer module is advantageously provided where it is desired to do an impedance match to the ultimate load to be connected to output node 81. Where such impedance matching is not required or desired, output buffer module 40 may be eliminated. Such an application is shown in FIG. 4 where the output node 81 may be connected directly to the output device to be controlled by the circuit.

In the embodiment where output buffer module 40 is employed, as shown in FIG. 5, output buffer module 40 comprises first buffer node 86 which is connected to first input node 82 of the current mirror module 20. First buffer node 86 is also connectable to power supply 104. Output buffer module 40 is further connected at current mirror module output node 81. Output buffer module 40 provides an output signal at buffer output node 80. In the embodiment shown in FIG. 5, output buffer module comprises transistor 42, which is shown as an NPN transistor. As described earlier, a circuit to accomplish the same objective can be configured using inverse components, in which case transistor 42 would be a PNP transistor. Output buffer module 40 may further comprise resistor 44 which may be employed where the load to be applied to buffer output node 80 is unknown. However, where the load to be applied to output buffer node 80 is known resistor 44 is not necessary. As shown in FIG. 5, transistor 42 acts as an emitter follower, buffering the rest of the circuit 10 from effects due to the load which is to be attached to output buffer node 80. As indicated, resistor 44 serves primarily as a pull down and its value may be modified to match impedance requirements of loads to be attached to output buffer node 80.

Load (Power Supply)

Although circuit 10, 110, and 210 are shown in FIGS. 5, 4, and 6 respectively as having load or power supply 104, the circuit may be manufactured having only connection points for the power supply. Specifically, turning to FIG. 3, the power supply connection wires 98 are shown connected to an assembled sensor circuit 5 containing the circuit of the present invention connected to sensor 101.

Operation of the Present Invention

The operation of the present invention will now be described in detail, referring specifically to the embodiment of the circuit shown in FIG. 5. It will be appreciated that variations on the circuit such as for example those shown in FIGS. 6A and 6B will operate in similar, although not identical, manner, without detracting from the general concept of the invention. Further, variations in each of the modules may vary minor operational characteristics of the circuit, but not the general operation.

Turning to FIG. 5, a power supply or voltage/current source 104 is made available to the circuit 10. The power supply may be for example a direct current battery. In the following discussion, for the purposes of illustration only, it will be assumed that the power supply 104 is a 5 volt direct current battery. It will also be assumed for discussion purposes only that sensor 101 is limited to a 1 volt potential being applied across its contact points. Also in the following discussion, it will be assumed that sensor 101 is a resistive responsive force sensor, which reduces resistance of the sensor in response to a force being applied thereto. As described above, the sensor may embody other parameter sensing capabilities such as temperature. It will also be appreciated that sensors which provide greater resistance in response to pressure may also be employed merely by reconfiguring the current mirror module 20.

In the present illustration, resistors 34 and 36 in the voltage limiter module are selected to be 10 k ohm and 15 k ohm resistors respectively, and transistor 32 is a PNP transistor, as shown in FIG. 5. Resistors 34 and 36 will form approximately a 4 volt fixed voltage across the resistor divider which they form. The voltage at the bottom side of sensor 101 at node 83 will then be established a diode drop above the voltage across resistor 34 and 36 due to transistor 32. The voltage at the top end of sensor 101 at node 87 is fixed at a voltage which is below node 82 voltage by the collector-emitter voltage of transistor 22. Consequently, a roughly constant voltage across sensor 101 and resistor 102 is thus established. In the present embodiment, resistor 102 is selected at 100 k ohm. The force resisting sensor 101 may have a resistance of between 5 megaohms (M ohms) and 20M ohms when no force is being applied to the sensor. Under full load, the resistance of sensor 101 may drop as low as 20 k ohms. Again, it is to be emphasized that the figures provided for the circuit components are by way of illustration only to show one example of the present invention.

When force is initially applied to sensor 101, the impedance of the sensor is extremely high, and thus resistor 102 is dominant. This allows a certain fixed amount of current to flow through resistor 102 since, as described above, it is established at a fixed voltage. The current flowing through resister 102 is essentially the current flowing through transistor 22, absent a small base current which flows through base connector 28. Consequently, the current through transistor 22 and resistor 102 is mirrored in transistor 24 of the current mirror module 20. The current flowing through transistor 24 sets up a voltage at the collector of that transistor. Thus, a fixed voltage is established for normal operation where the sensor 101 has no force applied thereto. However, as pressure is applied to sensor 101, its resistance drops. Performance of the sensor will vary according to the manufacturer and the specifications, however, in the example being discussed, the drop in resistance in sensor 101 is roughly exponential with the pressure applied to the sensor. For example, where sensor 101 has a 2-pound range, a force of 1 pound will have a relatively small effect on the resistance of sensor 101. At 1.5 pounds of force more change is seen, at 1.75 pounds an even greater significance in the reduction of the resistance is noticed, and so on until at a force of 2 pounds the resistance in sensor 101 is approximately 20 k ohms.

When the resistance of sensor 101 is approximately equal to the resistance of resistor 102, the overall impedance of the force response module 100 becomes dominated by sensor 101. In fact, when the resistance of sensor 101 is equal to the resistance of resistor 102, the resistance of the entire force resisting module is approximately 50 k ohm. However, recall that the voltage applied across resistor 102 is relatively constant as a result of the voltage limiter module 30. Consequently, the current through the force sensor module will double from the unloaded position where no force is being applied to sensor 101. Consequently, the current through transistor 22 will double likewise causing the current through transistor 24 to double. Doubling of the current through transistor 24 will cause the voltage across resistor 26 to increase accordingly. Consequently, the smaller and smaller the resistance of sensor 101 gets, because of the parallel combination of resistor 102 and sensor 101, the larger the output voltage established across resistor 26 will be.

With the increase of current flow through transistor 24 comes a concomitant increase of current flow at the output node 81 of the current mirror module 20. An increase in the current flow to the base of the transistor 42 of the output buffer module 40 will cause an increase in the current flow from the emitter of transistor 42. This current is used to drive the output signal from the circuit. As indicated earlier, where an impedance is applied to buffer output node 80, resistor 44 is not required, since a resistance will be established across the impedance of the connected load.

In the example just discussed, the value of resistor 26 is 150 k ohm and the value of resistor 44 is 20 k ohm. Resistor 101 in the force response module and resistor 26 in the mirror current module serve to set bias currents, overall gain, and transfer function. Resistor 26 should preferably be set at a resistance value greater than that of resistor 102.

Turning to FIG. 7, alternate embodiments of the present invention are shown. Specifically, FIG. 7 shows the addition of a diode 103 connected between voltage fixing node 89 and ground. Diode 103 serves for temperature compensation of transistor 42. Likewise, resistor 36 of FIG. 5 may be replaced with the Zener diode 33 of FIG. 6A. This further provides temperature compensation capabilities for the circuit.

The circuit of the present invention is designed to be manufactured in volume at low cost. It is also desirable that the finished product should be small in size and robust for a wide variety of applications. Consequently, in the preferred embodiment of the design, the components are all surface mounted components being applied to a first side (the "top" side) of a printed circuit board. The force resisting sensor 101 may for example be the UniForce sensor which is manufactured by Force Imaging Technologies. The sensor is extremely thin and approximately 15 mm in diameter and may be attached by conductive adhesive to a printed circuit board. In one example, the sensor was attached to the second side ("bottom" side) of the printed circuit board opposite the side on which the surface mounted components are mounted.

The assembled circuit board and sensor may be further ruggedized by applying a resilient material such as a rubber coating. In one example, the assembled circuit was coated with "PlastiDip" which is a coating manufactured by PDI, Inc. of Circlepines, Minn. (their part number 11601). Sealing the assembled circuit in such a coating can provide all-weather capability for the circuit.

Method

The present invention provides a novel method of creating a circuit which provides a variable input in response to a physical parameter input such as force, temperature, or the like. The method is particularly applicable to circuits in which the sensor varies a current in response to the physical parameter sensed by the sensor. As the current varies in the sensor in response to input of physical parameter, a second approximately equal current is varied similarly. The second current may then be used to form an output signal responsive to the input of the physical parameter to the sensor. The second current is preferably produced using a current mirror.

Novel methods are also provided for creating a circuit with a physical parameter sensor having a load capability much less than the desired load range for the output or the input. In the method, the voltage which may be applied across the sensor is limited by causing part of the available input voltage to be placed across a voltage limiter, and then using the second current from the current mirror to control a larger current which may then be used to generate an output signal. The voltage limiter preferably acts by fixing the voltage at either side of the sensor.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A physical parameter sensing circuit, comprising:
   a) a current mirror module having an input node and a first and second output node, said input node connectable to a power source, said second output node configured to follow current of said first output node;
   b) a physical parameter responsive circuit element comprising a variable resistance sensor and having a first connection at said first output node of said current mirror to change the current at said first output node substantially proportional to the physical parameter; wherein said second output node acts as an output signal point for said circuit indicative of the physical parameter.

2. The circuit of claim 1 wherein said physical parameter responsive circuit element comprises a force sensing resistor.

3. The circuit of claim 1 wherein said physical parameter responsive circuit element further comprises a grounded second connection.

4. The circuit of claim 1 wherein said physical parameter responsive circuit element further comprises a voltage controlled second end.

5. The circuit of claim 1 further comprising a first resistive component in parallel with said physical parameter responsive circuit element.

6. The circuit of claim 1 further comprising a voltage limiter, said voltage limiter configured to limit voltage which can be applied across said physical parameter responsive circuit element by a power source.

7. The circuit of claim 1 further comprising an output buffer, said output buffer connected to said second output node and configured to buffer said circuit from loads which may be connected to said output signal.

8. The circuit of claim 1 wherein said current mirror comprises a first b-j-t mirror transistor and a second b-j-t mirror transistor, said first and said second mirror transistors having a common connection at their bases and a common connection at said input node.

9. The circuit of claim 8 wherein said emitters of said first and said second mirror transistors are connected in common at said input node.

10. The circuit of claim 8 wherein said force sensing resistor is connected to the collector of said first mirror transistor.

11. The circuit of claim 8 wherein said first and said second mirror transistors are PNP transistors.

12. The circuit of claim 8 wherein said first and said second mirror transistors are NPN transistors.

13. The circuit of claim 8 wherein said first mirror transistor output is connected to said first output node and said second mirror transistor output connected to is said second output node.

14. The circuit of claim 8 wherein said first mirror transistor output is connected to said bases of said first and said second mirror transistors.

15. The circuit of claim 13 wherein said current mirror further comprises a first mirror resistor in parallel with said second output node.

16. The circuit of claim 15 wherein said mirror resistor is grounded.

17. The circuit of claim 6 wherein said voltage limiter is connected to said input node in parallel with said current mirror.

18. The circuit of claim 6 wherein said voltage limiter comprises a diode.

19. The circuit of claim 6 wherein said voltage limiter comprises a limiter resistive component in parallel with said current mirror and a current sensitive element in series with said physical parameter responsive circuit element, said current sensitive element receiving controlling current from said limiter resistive component.

20. The circuit of claim 19 wherein said limiter resistive component comprises a resistor divider.

21. The circuit of claim 19 wherein said current sensitive element comprises a b-j-t limiter transistor, said limiter transistor base connected to said second resistive component.

22. The circuit of claim 21 wherein said resistor divider comprises in parallel a second resistor and a third resistor, and wherein said base of said limiter transistor is connected between said second and said third resistors.

23. The circuit of claim 21 further comprising a first resistive component disposed between said force sensing resistor and said limiter transistor input.

24. The circuit of claim 21 wherein said limiter transistor functions as an emitter-follower.

25. The circuit of claim 24 wherein said limiter transistor comprises a PNP transistor.

26. The circuit of claim 24 wherein said limiter transistor comprises a NPN transistor.

27. The circuit of claim 19 wherein said current sensitive element comprises a Zener diode.

28. The circuit of claim 20 wherein said limiter resistive component comprises a Zener diode.

29. The circuit of claim 7 wherein said output buffer comprises a b-j-t buffer transistor having its base connected to said second output node.

30. The circuit of claim 29 wherein the emitter of said buffer transistor is connected to said output signal point.

31. The circuit of claim 29 wherein the collector of said buffer transistor is connected to said input node.

32. The circuit of claim 19 wherein said output buffer comprises a buffer resistive component in parallel with said output signal point.

33. The circuit of claim 32 wherein said buffer resistive component is grounded.

34. The circuit of claim 8 wherein said first and said second mirror transistors comprise a monolithic transistor pair.

35. The circuit of claim 1 wherein said current mirror comprises an integrated circuit current mirror.

36. The circuit of claim 1 wherein said current mirror module and said physical parameter responsive circuit element are mounted on a printed circuit board, and wherein said printed circuit board is encased in a resilient material.

37. A force responsive circuit comprising:
   a) a current mirror module having an input node and a first and second output node, said input node connectable to a power source, said second output node configured to follow current of said first output node;
   b) a force responsive module providing a variable output signal indicative of an applied force and having a first force module node connected to said first output node of said current mirror, and a second force module node;
   c) a voltage limiter module, said voltage limiter module having a first voltage limiter node connected to said input node, and a second voltage limiter node connected to said second force module node, said voltage limiter module configured to limit voltage which can be applied across said force responsive module by a power source; and
   d) an output buffer, said output buffer having a first buffer node connected to said input node, a second buffer node connected to said second output node, and a buffer output node, said output buffer configured to buffer said circuit from loads which are adapted to be connected to said buffer output node,
   wherein said buffer output node acts as an output signal point for said circuit.

38. The circuit of claim 37 wherein said current mirror module comprises a pair of parallel b-j-t mirror transistors having commonly connected bases, emitters commonly connected to said input node, a first emitter connected to said first output node, and a second emitter connected to said second output node.

39. The circuit of claim 38 wherein said current mirror module further comprises a first current mirror resistor connected to and in parallel with said second output node.

40. The circuit of claim 37 wherein said force responsive module comprises a force sensitive resistor.

41. The circuit of claim 40 wherein said force sensitive resistor is configured to decrease current resistance in response to increased pressure being applied to said force sensitive resistor.

42. The circuit of claim 40 wherein said force responsive module further comprises a first force module resistor in parallel with said force sensitive resistor.

43. The circuit of claim 37 wherein said output buffer comprises a b-j-t buffer transistor having a collector connected to said first buffer node, a base connected to second output node, and an emitter connected to said buffer output node.

44. The circuit of claim 43 wherein said output buffer further comprises a buffer resistor connected in parallel to said buffer output node.

45. The circuit of claim 37 wherein said voltage limiter module comprises a diode.

46. The circuit of claim 37 wherein said voltage limiter module comprises:
   a. a serial resistor divider connected to said first voltage limiter node, said resistor divider causing a first divider voltage and a second divider voltage in response to a voltage being applied across said resistor divider; and
   b. a voltage limiter b-j-t transistor having an emitter connected to said second voltage limiter node, and a base and collector connected across said second divider voltage.

47. Method of generating a voltage output signal spanning an input voltage in response to a variable force input, comprising:
   a) providing a first current produced by said input voltage through a physical parameter sensor, said sensor varying resistance and said first current in response to the variable force input sensed by said sensor;
   b) producing a second current in response to and equal to said first current using a current mirror circuit, and providing said second current to an output load to produce said output voltage signal indicative of said variable force input.

48. The method of claim 47 further comprising the steps of:
   a. limiting the voltage which may be applied across said force sensor by causing part of said input voltage to be placed across a voltage limiter; and b. using said second current to control a larger current which may be used to generate said output signal.

49. A temperature compensating circuit, comprising:
a) a current mirror module having an input node and a first and second output node, said input node connectable to an input source, said second output node configured to follow current of said first output node;
b) a thermistor device having a first connection at said first output node of said current mirror to change current at said first output node substantially proportional to the thermistor device output; wherein said second output node acts as an output signal point for said circuit.

50. The circuit of claim 49 further comprising a voltage limiter, said voltage limiter configured to limit voltage which can be applied across said thermistor device by a power source.

51. The circuit of claim 49 further comprising an output buffer, said output buffer connected to said second output node and configured to buffer said circuit from loads which are adapted to be connected to said output signal.

* * * * *